March 19, 1935.     A. F. PLITT     1,994,833
DIAL TEST INDICATOR
Filed March 30, 1931
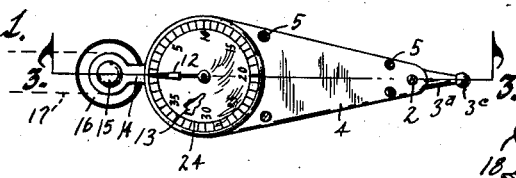
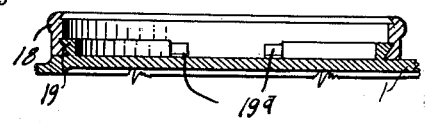
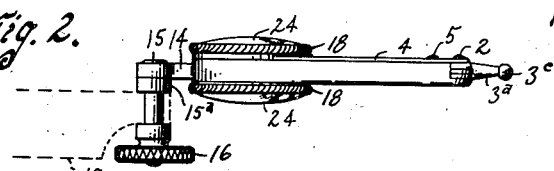
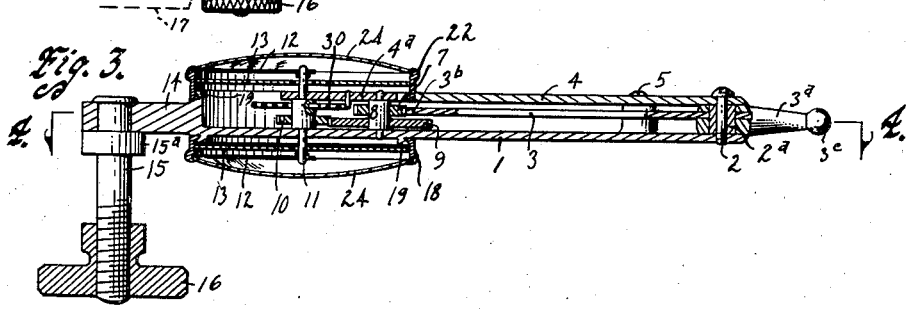
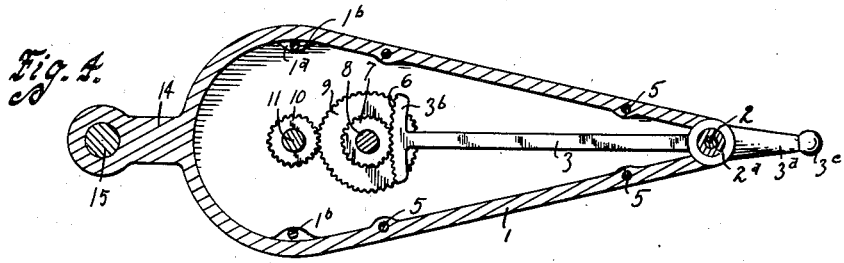
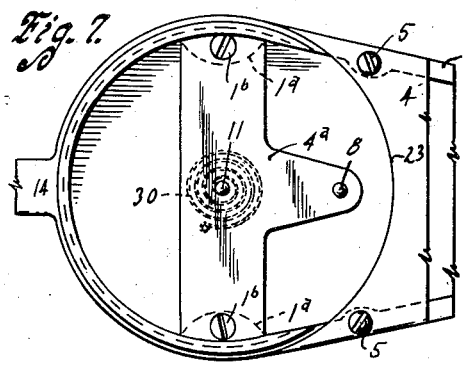
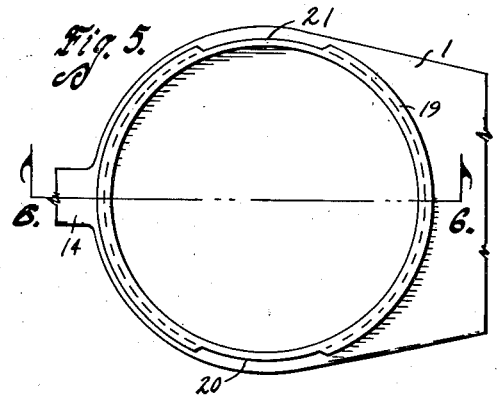
Inventor
Albert F. Plitt
By Bair, Freeman & Sinclair
Attorneys Patented Mar. 19, 1935

1,994,833

UNITED STATES PATENT OFFICE 1,994,833

DIAL TEST INDICATOR

Albert F. Plitt, Bryan, Ohio

Application March 30, 1931, Serial No. 526,297

2 Claims. (Cl. 33—172)

This invention relates to dial test indicators adaptable for use in connection with machine tools for indicating precision setup of work on said machine tools, also for setting up work in lathes, testing lathes, pins, shafting, and work of similar nature.

One object of my invention is to provide a dial indicator that is extremely compact in design and which can be used singly without auxiliary attachments for truing up work. In all former designs, the indicators are bulky in nature and generally depend for their adaptability upon numerous auxiliary fittings and attachments.

Another object of my invention is to provide an indicator having a double dial, that is a dial on each side of the machine, so that readings may be taken at either side of the work. Other indicators have only a single dial and the construction generally found in mechanisms of this nature would not permit the use of the double dial as I have shown.

Another object of my invention is to provide an indicator contact point that forms one end of a lever arm so that in recording the indication to the dial, the contact point is moved in an arc around the pivot instead of reciprocating in a straight line movement as has been the case in mechanisms of this nature.

Another object of my invention is to provide revolving dials that can be revolved so that the pointer indication on the dial can be brought to coincide with the pointer of the dial at the beginning of each operation, irrespective of that setting that may be found at that time on the contact point.

Another object of my invention is to provide a pivot at one extreme end of the dial indicator so that the other end of the indicator can be rotated about this pivot end. The object of this construction is to permit the free rotatable end of the indicator to be of slender proportions so as to be capable of insertion into small holes through which indication may at times be found desirable. Other indicators, generally by reason of their design, are compelled to have their pivot fastening intermediate of their ends, making for increased length and size.

Other objects and advantages of the invention are apparent from the following detailed description. While the invention in its broader aspect is capable of embodiment in various forms, a preferred embodiment thereof, and of the mechanism forming the same is illustrated in the accompanying drawing, in which Figure 1 is a plan view of the device.

Figure 2 is a side view of the mechanism.

Figure 3 is an enlarged fragmentary section of the mechanism taken along the line 3—3 in Figure 1.

Figure 4 is an enlarged fragmentary section of the mechanism taken along the line 4—4 in Figure 3.

Figure 5 is an enlarged plan view of one portion of the mechanism.

Figure 6 is an enlarged section taken along the line 6—6 in Figure 5 with other portions shown in section which do not appear in Figure 5.

Figure 7 is an enlarged view of one side of the mechanism with a dial and indicator needle removed.

Referring to the drawing:

1 is a housing enlarged at one end and tapered down to a smaller dimension at its other end. Into a tapped hole at the small end is screwed a screw 2 on which is trunnioned the pivot bearing bushing 2a of the indicator arm 3. Extending out from the pivot screw 2 and from the housing is a short end, 3a, of the indicator arm 3. This short end, 3a, terminates in a ball shaped member 3c the purpose of which is more fully described hereinafter. The housing (1) is fitted with a cover plate, 4, which plate is fastened by means of screws, 5, to the housing, 1. A hole at one end of the cover, 4, provides support for the end of the screw, 2, opposite that end which is screwed into housing, 1, and the pivot portion of the indicator arm, 3, is contained between the inner wall of housing, 1, and the inner wall of cover, 4, as shown in Figure 3. The indicator arm 3 is in two parts, and split at its pivot, the portion 3 extending internally of the housing, 1, and the portion 3a extending from the housing 1. The bushing, 2a, is interposed between the inner wall of cover 4 and wall of housing 1 and over screw 2. The pivoted ends of 3 and 3a are formed for rotating movement over the bushing 2a and it is evident that end 3a can be moved independently of end 3 and that this independent movement is retarded by the walls of the clevis on end of portion 3a, which are made so as to grip associated end of portion 3. The bushing 2a is made slightly longer than the width of the clevis on portion 3a so that screw 2 cannot tighten the joint against rotation. It is thus evident that the pivot formed by the clevised ends of 3a and 3 is free to rotate over bushing 2a. The end of the indicator arm 3 opposite that end swiveled over 2a is terminated in a segmentary gear shaped portion 3b, containing gear teeth 6 which mesh with teeth in a gear 7. Gear 7 is fastened for rotation with a shaft 8 trunnioned at one end in a hole in housing 1 and at its other end in a hole in the cover 4a. Mounted on this shaft 8 and adjacent to the gear 7 is another gear 9. The cover 4a is fastened to projecting lugs 1a on housing 1 by screws 1b, see Figure 6.

It is now evident that when movement is imparted to the ball shaped member of indicator arm 3, indicator arm 3 will be rocked about its pivot screw 2 and rotary movement imparted to the gear 7 by reason of the engagement of the teeth 6 of the segmentary gear portion of indicator arm with the teeth in gear 7. It is also evident that rotary movement when applied to gear 7 will produce rotary movement to gear 9.

In my construction I have not shown keys or other means of fastening these gears 7 and 9 to the shaft 8 as it is evident that in a device of this small nature, the gears can be pressed on to the shaft 8 with a degree of tightness that will enable the limited power required to be imparted from one gear through the shaft to the other gear.

Coacting with the teeth in gear 9 are teeth of another gear 10. Gear 10 is mounted on to an enlarged center portion of a shaft 11, pressed thereon so that driving motion imparted from gear 9 will cause a turning of the shaft 11.

Shaft 11 in its center portion is enlarged and from each end of this enlarged portion extend portions reduced in diameter which carry at their outer ends pointers 12 adaptable for indicating in connection with dial plates 13 that degree of movement that may be imparted to gear 10 by gears 9, 8 and associated indicating arm 3 when rocking movement is imparted to the ball shaped end 3c of the indicator arm 3a.

These reduced diameter extensions of shaft 11 are trunnioned for turning movement at one side in a hole contained in housing 2 and at the other side in a hole contained in the cover 4a. These reduced diameter extensions also pass freely through holes in the center of the dials 13. (Figure 3.)

The pointer 12 at its inner end terminates in a hole into which the end of the shaft 11 is pressed as is shown in Figure 1. The outer end of the pointer terminates in an arrow. The dials 13 are graduated into any suitable divisions and in the present construction as shown these divisions are equal to .001 parts of an inch, totaling .040 for one revolution of the pointer 12.

Extending from the housing 1 at its end opposite that end containing the screw 2 is a support arm 14 fastened on to one end of shaft 15 for turning movement therewith. In the present instance I have shown this fastening to be by means of the riveted overend of the shaft 15 tightening the extension 14 between the riveted overend and enlarged shoulder portion 15a of shaft 15 as shown in Figure 3. At the opposite end of this shaft 15 is screwed for adjustable movement thereupon a tightening nut 16. The purpose of this shaft is to enable the mechanism to be mounted at the end of any suitable holder, one means of which I have illustrated by dotted lines 17 of a holder bar in Figures 1 and 2.

A dial holder 18 extends from one side of the housing and is guided for rotary movement upon a bevel portion 19 formed in the side of the housing 1. (Figure 6.) This beveled portion is cut away at opposite sides shown in Figure 5 at points 20 and 21. The dial holder 18 is snapped over on to the beveled portion 19. The beveled portion 19a of the dial holder 18 forms with the portion 19 a bearing. The cutaway portions 20 and 21 are provided merely to permit more ready assembly of the dial holder 18. This beveled construction is very similar to that found in watch cases but in the construction in watch cases the bevel is small and unbroken and the contact between the two watch members is tightly made to prevent dirt and foreign matter from entering. In my construction the larger bevel provides a construction that will permit the dial to be rotated about the member 19 without coming off and, as before stated, the cutaway portions 20 and 21 make it possible to snap this bevel 19a on the member 18, to positive position on the member 19.

At the side of the housing opposite the dial holder 18 is mounted for turning movement thereupon a second dial holder 22. Similar beveled bearing portions 19 and 19a are formed in that side of the housing and in the adjacent end of the holder 22. The beveled portion formed in the housing is shown in Figure 7 which is a plan view of this end of the housing with the dial holder 22 removed. The cover 4 extends down to a circular formed end adjacent to the associated side of the dial holder 22 as shown by line 23 in Figure 7. It will be seen in Figure 7 that the beveled portion on housing 1 at the side on which dial holder 22 is carried is cut away and does not form a complete circle. This permits the dial holder 22 to be snapped on to the beveled member for turning movement thereon in a manner similar to which dial member 18 is carried on its associated beveled bearing 19.

On to the dial carrier 22 and the dial carrier 18 is pressed for turning movement therewith the dial 13, assembly of dial 13 being effected merely by the forcing of it in to the inner periphery of its respective holder as shown in Figure 3. At the outer edge of each holder 18 and 22 is a recess on to which is snapped a transparent celluloid disc 24. This construction is identical with that for holding watch crystals in watch cases and, being common in the art, is not further described. A hair spring 30 provides means to hold the gear train tightly against lost motion. The one end of the spring 30 is fastened to the shaft 11 and the other end being fastened to the cover 4a, suitable retaining holes being provided in each portion 4a and 11 to receive the respective ends of the spring.

The operation of the mechanism is as follows:

A holder 17 is held in any suitable manner on a machine to which the device may be connected and the dial indicator is gripped on to the desired portion of the machine by a tightening of the nut 16 which then grips the shaft 15 against turning movement on the end of the part 17. The part 17 is now moved so as to bring the ball member 3c on the end of the indicator arm 3a in contact with the work or part to be indicated. Interfering contact of the work with this ball member will produce a rocking of the indicator arm on its pivot to impart rotary movement to the gear train consisting of gears 7, 9, and 10. This rotary movement will be imparted to shaft 11 and to indicator pointers 12 which will indicate on dials 13 the amount that the work is out of balance or out of true. This operation of indicating trueness of work is a very familiar procedure in the art of toolmaking and a further description of using this dial indicator is not here made or further disclosed. It is evident that the holder 17 can be replaced by a round bearing rod in a surface gauge, etc.

I wish it understood that the means of embodying my invention as here disclosed and described constitute only a certain form of my invention and that other methods could be employed mechanically to do certain of the functions obtainable and that changes are contemplated by me and that such constructional changes, within the scope of my claims, would not constitute a departure from my invention.

Having thus described my invention what I claim as new and desire to secure Letters Patent upon is:

1. In a test indicator, a housing, an indicator arm pivoted in said housing and having a contact portion projecting therefrom, a shaft journaled in the housing, gear connections between the inner end portion of said indicator arm and the shaft, an indicating pointer fixed to said shaft, a substantially annular beveled flange on the housing concentric with said shaft and having a broken away portion, a dial carrier revolvably mounted on said beveled flange and having a second beveled flange for snap on cooperation therewith to retain the two assembled but permit relative rotation, and a graduated dial carried by said carrier to cooperate with said pointer.

2. In a test indicator, a housing, an indicator arm pivoted therein and having a contact portion projecting from one end thereof, a shaft journaled in the housing, gear connections between said indicator arm and the shaft, indicating pointers fixed to said shaft on opposite faces of said housing, a graduated dial arranged to cooperate with said pointer, said housing being formed with a rigid support arm projecting from its opposite end, a threaded stud fixed rigidly to said support arm and adapted to be engaged with an apertured holder bar, and a hand nut on the threaded portion of said stud adapted to be tightened against the holder bar for holding the device rigidly in selected relation to said holder bar for engagement with the work.

ALBERT F. PLITT.